Patented Nov. 19, 1940

2,221,933

UNITED STATES PATENT OFFICE 2,221,933

WETTING COMPOSITION

Michael A. Eitelman and Lawrence H. Flett, Hamburg, N. Y., assignors to National Aniline & Chemical Company, Inc., New York, N. Y., a corporation of New York No Drawing. Application December 30, 1937, Serial No. 182,627

23 Claims. (Cl. 252—1)

The present invention relates to compositions which are valuable as improved wetting and impregnating agents in acid aqueous solutions.

It is known that water-soluble sulfonates of nuclearly alkylated aromatic compounds, such as isopropyl naphthalene sulfonic acid, di-isopropyl naphthalene sulfonic acid, butyl naphthalene sulfonic acid, tetradecyl phenol sulfonic acid, etc., in the form of the free acids or water-soluble salts, have properties which make them useful as wetting agents in various industrial processes, particularly in the wet-treatment processes of the textile industry. In many processes, for example, in carbonizing processes and processes for the washing of fruits and vegetables, acid aqueous solutions are employed. The efficiency of these processes is dependent in large measure upon the rapidity and thoroughness with which the acid aqueous solutions employed therein are able to wet and impregnate the materials being treated.

The principal object of the present invention is to provide compositions which contain one or more water-soluble nuclearly alkylated aromatic sulfonates, and which have the property of imparting to their acid aqueous solutions markedly increased wetting and impregnating powers as compared with the acid aqueous solutions of the sulfonates alone.

Other objects of the invention will in part be obvious and will in part appear hereinafter.

The compositions of the present invention comprise one or more nuclearly alkylated aromatic sulfonates in admixture with one or more water-insoluble alcohols containing from 6 to 12 carbon atoms, such as capryl alcohol (secondary octyl alcohol), lauryl alcohol, and the like, and one or more water-insoluble alkyl phenols, such as decyl phenol, secondary amyl phenol, and the like. It has been discovered that by combining a water-soluble sulfonate of this type with a water-insoluble alcohol of the class specified and a water-insoluble alkyl phenol, compositions are obtained which have the property of imparting to their acid aqueous solutions marked wetting and penetrating powers; being superior with respect to this property to the nuclearly alkylated aromatic sulfonates alone, or to the combination of such sulfonates with one or more of said alcohols only, or with one or more of said phenols only. Especially valuable compositions of this type are those which comprise di-isopropyl naphthalene sulfonates and such small amounts of the alcohol and phenol that the compositions are readily dispersible or soluble in acid solutions. Capryl alcohol and secondary amyl phenol are the preferred alcohol and phenol for use in the compositions.

The compositions may be made by mixing the three ingredients in any order and in any convenient manner. The nuclearly alkylated aromatic sulfonates, which may be prepared by any of several suitable methods which are well known in the art, may be employed in the crude or purified form in the preparation of the present compositions. It has been found, for example, that the compositions may be prepared economically in an especially valuable form by using as a starting material a mixture of a nuclearly alkylated aromatic sulfonic acid and a portion of the sulfuric acid of the sulfonation mixture in which the sulfonic acid has been formed by a reaction between the corresponding nuclearly alkylated aromatic compound and sulfuric acid. In such case the sulfonation of the nuclearly alkylated aromatic compounds as, for example, nuclearly alkylated hydrocarbons or nuclearly alkylated phenols or phenetols, is carried out in the usual way, and the crude oily sulfonation product obtained, after removal of the excess sulfuric acid, is treated with water and permitted to settle into an oily layer and a water layer containing most of the residual sulfuric acid. On removal of the water layer, there remains an oily sulfonation product which is principally composed of a nuclearly alkylated aromatic sulfonic acid, water, and a comparatively small amount of sulfuric acid. This oily sulfonation product, preferably after being diluted with water, is then mixed with a small amount each of a water-insoluble alcohol containing 6 to 12 carbon atoms and a water-insoluble alkyl phenol to produce a composition constituting a valuable wetting and impregnating agent.

As already stated, the compositions of the present invention possess properties which make them superior as wetting and impregnating agents in acid aqueous solutions to compositions that consist of a nuclearly alkylated aromatic sulfonate and a water-insoluble alcohol, such as capryl alcohol, and to compositions that consist of a nuclearly alkylated aromatic sulfonate and a water-insoluble alkyl phenol, such as secondary amyl phenol. For example, capryl alcohol and di-isopropyl naphthalene sulfonic acid form mixtures which do not yield clear solutions in dilute aqueous sulfuric acid; e. g., a five per cent solution of sulfuric acid, but the acid aqueous turbid solutions of these mixtures have excellent wetting power. On the other hand, secondary amyl phenol and di-isopropyl naphthalene sulfonic acid form mixtures that dissolve clearly in an aqueous five per cent solution of sulfuric acid. These solutions, however, have poor wetting power, unless a relatively large amount of secondary amyl phenol is present; e. g., unless the secondary amyl phenol is present in the ratio of about one part by weight for each twelve parts by weight, or less, of di-isopropyl naphthalene sulfonic acid.

As contrasted with these mixtures it has been found that a mixture containing di-isopropyl naphthalene sulfonic acid together with a combination of capryl alcohol and secondary amyl phenol in equal parts in the ratio of not more than one part by weight of the combination of capryl alcohol and secondary amyl phenol for each fifteen parts by weight of di-isopropyl naphthalene sulfonic acid retains the solubility characteristics of the amyl phenol and has wetting characteristics superior to the capryl alcohol compositions; e. g., at concentrations of one part by weight of the mixture for each 500 parts of an aqueous five per cent solution of sulfuric acid. This triple organic compound mixture yields practically clear aqueous acid solutions with excellent wetting and penetrating power.

In preparing the compositions, therefore, an amount of the alcohol should be used sufficient to increase the wetting power of the alkylated aromatic sulfonate, and the amount of the phenol used should be such that the compositions have greater solubility or dispersibility in acid aqueous solutions than the compositions which do not contain this compound. It will be understood that the amounts of the alcohol and phenol necessary to accomplish these results in each case cannot be exactly fixed since they are dependent upon the specific properties of the alkylated aromatic sulfonate, the alcohol, and the phenol used, and the use to which the compositions are to be put.

In most cases, it has been found to be preferable to employ the alcohol and the phenol in about equal parts by weight. Our researches have indicated, however, that satisfactory results may be obtained when the weight ratio of either of these added substances to the other is reduced to as low as one to three or even lower. The total weight of these two substances in the compositions preferably should not exceed about one and one-third parts by weight, and for best results should not be greater than about one part by weight, for an amount of the alkylated aromatic sulfonate corresponding to 20 parts by weight of the alkylated aromatic sulfonate in the form of the sodium salt. Compositions containing a greater proportion of the alcohol and phenol ordinarily are not preferred, because of the increased turbidity of their aqueous acid solutions. They are included within the scope of the invention, however, and may be employed with advantage when turbidity is not a controlling consideration. In general, in order to realize a commercially important effect due to the presence of the water-insoluble alcohol and water-insoluble phenol, the total weight of the two compounds should not be less than that corresponding to about one-third part for each 20 parts of the alkylated aromatic sulfonate in the form of the sodium salt.

The compositions of the present invention may be employed in any process where it is desired to take advantage of their power to impart to their acid aqueous solutions wetting and impregnating properties. For example, the acid aqueous solutions of the compositions have excellent wetting properties when applied to textile materials of all kinds, especially at temperatures below 60° C. These solutions are valuable adjuncts in carbonizing treatments in which they aid penetration of the acid and shorten the carbonizing period markedly without injury to the treated wool. Further, the solutions are effective in aiding the washing and cleaning of fruits and vegetables generally, and, in particular, to remove therefrom poisonous, tarry and oily deposits from parasiticidal sprays and similar adhering foreign matter.

In order that the invention may be more fully understood, reference should be had to the following specific examples in which are disclosed preferred compositions coming within the scope of the present invention. It will be understood that these examples are given for illustrative purposes merely and are not intended to limit the invention. The parts are by weight and the temperatures are in degrees centigrade:

*Example 1*

Part 1.—Di-isopropyl naphthalene is sulfonated with about 2.7 molecular equivalents of sulfuric acid monohydrate at a convenient temperature between 100° and 110°, until a sample of the mixture is completely soluble when neutralized with aqueous caustic soda in about ten times the sample weight of water. The sulfonation mass is allowed to stand until the sulfonated oily product has separated from the excess sulfuric acid and the sulfuric acid layer is then withdrawn. The remaining sulfonated oil is thoroughly mixed with about one-third of its weight of water, and the mixture is again allowed to settle. The aqueous layer which has abstracted almost all of the residual sulfuric acid is withdrawn. There remains an oily sulfonation product, which is chiefly a mixture of di-isopropyl naphthalene sulfonic acid, water, and a relatively small amount of sulfuric acid which does not exceed 15 per cent of the weight of the sulfonic acid. This crude mixture is diluted with water to a uniform oily liquid which contains about 60 per cent di-isopropyl naphthalene sulfonic acid.

Part 2.—98 parts of the aqueous mixture produced in Part 1 is mixed with one part of capryl alcohol and one part of secondary amyl phenol.

The resulting mixture is a homogeneous, clear, brown oil, which dissolves clearly in water, and even when it is diluted to the extent of one part of this oil in 1000 parts of water, it forms an aqueous solution having valuable wetting properties for textile materials, and being especially useful when employed in carbonizing treatments. The solution is also effective in aiding the washing of fruits and vegetables.

A particularly useful commercial composition is made by diluting the oily mixture (obtained according to Part 2 of Example 1) with water until it comprises between 45 and 55 parts by weight of di-isopropyl naphthalene sulfonic acid, between 50 and 55 parts by weight of an aqueous solution of sulfuric acid containing less than 10 parts of sulfuric acid, about three-quarter part by weight of capryl alcohol, and about three-quarter part by weight of secondary amyl phenol.

It will be understood that the proportions of ingredients specified in this example are approximations. Hence, in terms of parts by weight, the composition of Part 2, Example 1, contains about 60 parts of di-isopropyl naphthalene sulfonic acid and about 40 parts of an aqueous solution of sulfuric acid containing less than about 10 parts of sulfuric acid, about one part of capryl alcohol, and about one part of secondary amyl phenol.

Example 2

96 parts of the crude aqueous di-isopropyl naphthalene sulfonic acid produced in Example 1, Part 1, and containing 60 per cent of di-isopropyl naphthalene sulfonic acid is mixed with two parts of capryl alcohol and two parts of secondary amyl phenol. One part of the resulting dark-brown oil dissolved in 500 parts of an aqueous five per cent solution of sulfuric acid yields a slightly turbid solution which has excellent wetting, penetrating, and impregnating properties.

Example 3

500 parts sodium di-isopropyl naphthalene sulfonate (containing less than five per cent inorganic salts, chiefly sodium sulfate), 10 parts capryl alcohol, and 10 parts secondary amyl phenol are thoroughly mixed to form a homogeneous white powder. 1 part of the powder dissolved in five or more parts of water yields clear solutions. A solution of 0.52 part of the powder in 500 parts of five per cent aqueous sulfuric acid is clear and has good wetting properties.

Compositions which are characterized by the same qualities as those of the composition illustrated in Example 3 are obtained by replacing sodium di-isopropyl naphthalene sulfonate with an equal weight of sodium mono-octyl naphthalene sulfonate or by replacing the capryl alcohol with an equal amount of "lorol" alcohol, or by replacing secondary amyl phenol with an equal quantity of isopropyl phenol or decyl phenol.

Example 4

1000 parts of sodium "keryl" phenol sulfonate, 10 parts of capryl alcohol, and 10 parts of secondary amyl phenol are thoroughly intermixed, whereby a homogeneous, dry, faintly yellow powder is obtained.

This powder is easily soluble in water, and acid aqueous solutions thereof containing one part of the powder for five or more parts of dilute sulfuric acid are clear and have excellent wetting properties. The powder, therefore, is a valuable agent for use in carbonizing processes and other processes where acid aqueous solutions are employed.

The sodium "keryl" phenol sulfonate employed in this example is a mixture of about equal parts of the sodium salts of sulfonated alkyl phenols and inorganic salts, chiefly sodium sulfate, which mixture is obtained by sulfonating the Friedel-Craft condensation product of phenol and the mixture of alkyl chlorides made by chlorinating a kerosene fraction of petroleum consisting of a mixture of hydrocarbons containing from about 11 to about 18 carbon atoms, with an average molecular carbon content of about 14 carbon atoms, until it contains about 1.25 times the amount of organically combined chlorine required theoretically for monochlorination, and then neutralizing the resulting sulfonation product with a suitable sodium compound.

It will be understood that the compositions described in the foregoing examples merely typify preferred compositions coming within the scope of the invention. For example, as above pointed out, the compositions may be prepared by mixing in any order a crude or purified nuclearly alkylated aromatic sulfonic acid or water-soluble salt thereof with one or a mixture of water-insoluble alcohols containing 6 to 12 carbon atoms, such as lauryl, lorol (i. e., the mixture of alcohols obtained by reduction of the fatty acids in cocoanut oil), normal octyl, alpha-ethylhexanol, capryl alcohol, etc., and one or a mixture of water-insoluble alkyl phenols, such as isopropyl phenol, decyl phenol, secondary amyl phenol, etc. In preparing compositions by the general procedure described in Examples 1 and 2 using a crude sulfonation product containing in addition to the sulfonic acid of the nuclearly alkylated aromatic compound a proportion of water and sulfuric acid, in general, the crude sulfonation products which are suitable for use are those which contain from about 40 to about 75 per cent of the nuclearly alkylated aromatic sulfonic acid associated with about 60 to about 25 per cent of aqueous sulfuric acid in which the sulfuric acid content is less than 25 per cent of the final mixture.

In addition to the compositions disclosed in the above specific examples, compositions of substantially the same properties may be obtained with the use of other sulfonates of nuclearly alkylated aromatic compounds which impart increased wetting properties to acid aqueous solutions, and in which the alkyl groups contain at least 3 and not more than 18 carbon atoms, and particularly those which are sulfonates of nuclearly alkylated aromatic hydrocarbons of the naphthalene series and nuclearly alkylated mononuclear aromatic hydrocarbons, phenols, and ethers, which contain at least 6 and not more than 18 alkyl carbon atoms. Examples of such other compounds which may be employed are the following: dibutyl naphthalene sulfonate, dibutyl benzene sulfonate, diamyl benzene sulfonate, keryl benzene sulfonate, and keryl phenetol sulfonate, decyl naphthalene sulfonate, lauryl phenol sulfonate, cetyl phenetol sulfonate, capryl hydroxy diphenyl sulfonate, myristyl anisole sulfonate, etc. Keryl benzene sulfonates are prepared in the same manner as keryl phenol sulfonates, but benzene is used in place of phenol. Keryl phenol is converted to the ether by usual methods and sulfonated to obtain keryl phenetol sulfonates. The compositions may contain one or several such sulfonates.

In the preferred compositions containing capryl alcohol and secondary amyl phenol, these compounds are employed in amounts such that the capryl alcohol increases the wetting power of the alkylated aromatic sulfonate used and the secondary amyl phenol imparts to the compositions greater solubility and dispersibility in acid aqueous solutions than similar compositions not containing secondary amyl phenol. The compositions containing a di-isopropyl naphthalene sulfonate; e. g., di-isopropyl naphthalene sulfonic acid, capryl alcohol and secondary amyl phenol, preferably contain the combination of the capryl alcohol and secondary amyl phenol in the proportions of from one-third part to about one and one-third parts by weight for an amount of the di-isopropyl naphthalene sulfonate corresponding to 20 parts by weight of di-isopropyl naphthalene sodium sulfonate.

It will be recognized by those skilled in the art that changes may be made in the compositions described above. It is intended, therefore, that all matter contained in the above description shall be interpreted as illustrative and not in a limiting sense.

We claim:

1. A composition for use as a wetting and impregnating agent in aqueous acid media, comprising a nuclearly alkylated aromatic sulfonate, a water-insoluble alcohol containing from 6 to 12 carbon atoms, and a water-insoluble alkyl phenol.

2. A composition for use as a wetting and impregnating agent in aqueous acid media, comprising a di-isopropyl naphthalene sulfonate, a water-insoluble alcohol containing from 6 to 12 carbon atoms in an amount at least sufficient to increase the wetting action of the di-isopropyl naphthalene sulfonate in aqueous acid media, and a water-insoluble alkyl phenol containing at least 3 carbon atoms in an alkyl group.

3. A composition for use as a wetting and impregnating agent in aqueous acid media, comprising an alkyl mono-nuclear aromatic sulfonate containing 6 to 18 alkyl carbon atoms, a water-insoluble alcohol containing from 6 to 12 carbon atoms in an amount at least sufficient to increase the wetting action of the alkyl mono-nuclear aromatic sulfonate in aqueous acid media, and a water-insoluble alkyl phenol containing at least 3 carbon atoms in an alkyl group.

4. A composition for use as a wetting and impregnating agent in aqueous acid media, comprising a nuclearly alkylated aromatic sulfonate, capryl alcohol, and secondary amyl phenol.

5. A composition for use as a wetting and impregnating agent in aqueous acid media, comprising a di-isopropyl naphthalene sulfonate, capryl alcohol in an amount at least sufficient to increase the wetting action of the di-isopropyl naphthalene sulfonate in aqueous acid media, and secondary amyl phenol.

6. A composition for use as a wetting and impregnating agent in aqueous acid media, comprising an alkyl mono-nuclear aromatic sulfonate containing 6 to 18 alkyl carbon atoms, capryl alcohol in an amount at least sufficient to increase the wetting action of the alkyl mono-nuclear aromatic sulfonate in aqueous acid media, and secondary amyl phenol.

7. A composition for use as a wetting and impregnating agent in aqueous acid media, comprising a nuclearly alkylated aromatic sulfonate wherein the alkyl group contains at least 3 carbon atoms, in admixture with a water-insoluble alcohol containing from 6 to 12 carbon atoms and a water-insoluble alkyl phenol, the total weight of the alcohol and the phenol not exceeding about one and one-third parts for an amount of the nuclearly alkylated aromatic sulfonate corresponding to 20 parts by weight of the nuclearly alkylated aromatic sulfonate in the form of the sodium salt.

8. A composition for use as a wetting and impregnating agent in aqueous acid media, comprising a nuclearly alkylated aromatic sulfonate wherein the alkyl group contains at least 3 carbon atoms, in admixture with capryl alcohol and secondary amyl phenol, the total weight of the alcohol and the phenol not exceeding about one and one-third parts for an amount of the nuclearly alkylated aromatic sulfonate corresponding to 20 parts by weight of the nuclearly alkylated sulfonate in the form of the sodium salt.

9. A composition for use as a wetting and impregnating agent in aqueous acid media, comprising a di-isopropyl naphthalene sulfonate in admixture with capryl alcohol and secondary amyl phenol, the total weight of the capryl alcohol and secondary amyl phenol, not exceeding about one and one-third parts for an amount of the di-isopropyl naphthalene sulfonate corresponding to 20 parts by weight of di-isopropyl naphthalene sodium sulfonate.

10. A composition for use as a wetting and impregnating agent in aqueous acid media comprising a nuclearly alkylated aromatic sulfonate wherein the alkyl group contains at least 3 carbon atoms, in admixture with a water-insoluble alcohol containing from 6 to 12 carbon atoms and a water-insoluble alkyl phenol, the alcohol and the phenol being present in about equal parts by weight and the total weight of the alcohol and phenol being less than about one part for an amount of the nuclearly alkylated aromatic sulfonate corresponding to about 20 parts by weight of the nuclearly alkylated aromatic sulfonate in the form of the sodium salt.

11. A composition for use as a wetting and impregnating agent in aqueous acid media comprising di-isopropyl naphthalene sulfonic acid in admixture with a water-insoluble alcohol containing from 6 to 12 carbon atoms and a water-insoluble alkyl phenol, the alcohol and the phenol being present in about equal parts by weight and the total weight of the alcohol and phenol not exceeding about one part for an amount of the di-isopropyl naphthalene sulfonic acid corresponding to about 20 parts by weight of di-isopropyl naphthalene sodium sulfonate.

12. A composition adapted for use as a wetting and impregnating agent comprising a nuclearly alkylated aromatic sulfonic acid, capryl alcohol, secondary amyl phenol, sulfuric acid, and water.

13. A composition adapted for use as a wetting and impregnating agent comprising a nuclearly alkylated aromatic sulfonate, a water-insoluble alcohol containing from 6 to 12 carbon atoms, a water-insoluble alkyl phenol, sulfuric acid, and water, and obtainable by mixing the alcohol and the phenol with a mixture comprising about 40 to about 75 per cent of the nuclearly alkylated aromatic sulfonate, and about 60 to about 25 per cent of aqueous sulfuric acid of a concentration such that the sulfuric acid constitutes less than 25 per cent of the phenol composition.

14. A composition adapted for use as a wetting and impregnating agent comprising di-isopropyl naphthalene sulfonic acid, capryl alcohol, secondary amyl phenol, sulfuric acid, and water, and obtainable by mixing capryl alcohol and secondary amyl phenol with a mixture comprising about 40 to about 75 per cent of di-isopropyl naphthalene sulfonic acid and about 60 to about 25 per cent of aqueous sulfuric acid of a concentration such that the sulfuric acid constitutes less than 25 per cent of the final composition.

15. A composition adapted for use as a wetting and impregnating agent comprising about 60 parts by weight of di-isopropyl naphthalene sulfonic acid, about 40 parts by weight of an aqueous solution of sulfuric acid containing less than 10 parts of sulfuric acid, about one part of capryl alcohol, and about one part of secondary amyl phenol.

16. A composition adapted for use as a wetting and impregnating agent comprising from about 45 to about 55 parts by weight of di-isopropyl naphthalene sulfonic acid, from about 50 to about 55 parts by weight of an aqueous solution of sulfuric acid containing less than 10 parts of sulfuric acid, about three-quarter part by weight of capryl alcohol and about three-quarter part by weight of secondary amyl phenol.

17. A method of improving the wetting and impregnating action of an aqueous acid solution containing a nuclearly alkylated aromatic sulfonate, which comprises incorporating with the solution a water-insoluble alcohol containing from 6 to 12 carbon atoms, and a water-insoluble alkyl phenol.

18. A method of improving the wetting and impregnating action of an aqueous acid solution containing a nuclearly alkylated aromatic sulfonate, which comprises incorporating with the solution capryl alcohol and secondary amyl phenol.

19. An aqueous acid solution having wetting and impregnating properties comprising a nuclearly alkylated aromatic sulfonic acid, a water-insoluble alcohol containing 6 to 12 carbon atoms, and a water-insoluble alkyl phenol.

20. An aqueous acid solution having wetting and impregnating properties comprising a nuclearly alkylated aromatic sulfonic acid, a water-insoluble alcohol containing 6 to 12 carbon atoms, and an alkyl phenol containing at least 3 carbon atoms in the alkyl group.

21. An aqueous acid solution having wetting and impregnating properties comprising a nuclearly alkylated aromatic sulfonic acid, capryl alcohol, and secondary amyl phenol.

22. An aqueous acid solution having wetting and impregnating properties comprising a nuclearly alkylated aromatic sulfonic acid wherein the alkyl group contains at least 3 carbon atoms, in admixture with a water-insoluble alcohol containing 6 to 12 carbon atoms in an amount at least sufficient to increase the wetting action of the nuclearly alkylated aromatic sulfonic acid in said aqueous acid solution, and a water-insoluble alkyl phenol, the total weight of the alcohol and the phenol not exceeding about one and one-third parts for an amount of the nuclearly alkylated aromatic sulfonic acid corresponding to 20 parts by weight of the nuclearly alkylated aromatic sulfonate in the form of the sodium salt.

23. An aqueous acid solution having wetting and impregnating properties comprising di-isopropyl naphthalene sulfonic acid in admixture with a water-insoluble alcohol containing 6 to 12 carbon atoms in an amount at least sufficient to increase the wetting action of the nuclearly alkylated aromatic sulfonic acid in said aqueous acid solution, and a water-insoluble alkyl phenol, the alcohol and the phenol being present in about equal parts by weight and the total weight of the alcohol and phenol not exceeding about one part for an amount of the di-isopropyl naphthalene sulfonic acid corresponding to about 20 parts by weight of di-isopropyl naphthalene sodium sulfonate.

MICHAEL A. EITELMAN.
LAWRENCE H. FLETT.